United States Patent [19]
Richardson

[11] 3,916,392
[45] Oct. 28, 1975

[54] THIN-FILM SEMICONDUCTOR MEMORY APPARATUS

[75] Inventor: John R. Richardson, Schenectady, N.Y.

[73] Assignee: General Electric Co., Schenectady, N.Y.

[22] Filed: May 28, 1968

[21] Appl. No.: 732,747

[52] U.S. Cl........... 340/173 R; 307/238; 307/317 R
[51] Int. Cl.².......................................... G11C 11/40
[58] Field of Search...... 340/173 NR; 307/279, 281; 317/234

[56] References Cited

UNITED STATES PATENTS 3,370,208 2/1968 Mizushima et al..................... 357/4

*Primary Examiner*—Richard A. Farley
*Assistant Examiner*—N. Moskowitz
*Attorney, Agent, or Firm*—Jerome C. Squillaro; Joseph T. Cohen

[57] ABSTRACT

A nonvolatile memory cell compatible with integrated circuitry is comprised of two thin-film storage diodes which exhibit asymmetric electrical resistance, connected in series opposition. A ONE is stored when one diode is in the high resistance state and the other in the low resistance state, and a ZERO is stored when these states of the diodes are reversed. An array of these cells may be batch fabricated on a smooth insulating substrate to achieve storage densities of $4 \times 10^4$ bits per square inch and cycle times of 100 nanoseconds.

12 Claims, 29 Drawing Figures

Inventor:
John R. Richardson,
by Marvin Snyder
His Attorney.

Inventor:
John R. Richardson,
by Marvin Snyder
His Attorney.

Inventor:
John R. Richardson,
by Marvin Snyder
His Attorney.

Inventor:
John R. Richardson,
by Marvin Snyder
His Attorney.

Inventor:
John R. Richardson,
by Marvin Snyder
His Attorney.

THIN-FILM SEMICONDUCTOR MEMORY APPARATUS

The invention herein described was made in the course of or under a contract or subcontract thereunder with the Air Force Department.

BACKGROUND OF THE INVENTION

This invention relates to data storage apparatus, and more particularly to a memory cell of thin-film storage diodes capable of being interconnected in a high bit storage density memory array.

The interfacing of magnetic memories with transistor logic circuits contributes significantly to the cost of computer memories. Two possible solutions to alleviate this problem have been suggested. One possible solution is to employ cryotrons in the addressing circuitry and cryogenic memory cells on the same substrate. This approach, however, requires attendant apparatus for maintaining extremely low temperatures. A second possible way of reducing the cost of the memory-logic interface is to employ active semiconductor devices as storage cells which can be integrated on the same semiconductor chip as the transistor logic circuitry. However, these memories are of small capacity and furthermore are inherently volatile; that is, a power interruption results in loss of the stored data.

The present invention concerns use of memory cells employing a thin-film storage diode of the type shown and described in J. R. Richardson application Ser. No. 631,775 filed Apr. 18, 1967 now U.S. Pat. No. 3,480,843 and assigned to the instant assignee. Employment of this diode in a memory cell results in a nonvolatile memory circuit which is fully compatible with silicon integrated circuitry. A memory circuit of this type can compete favorably in bit storage density and cycle times with magnetic thin film memories.

SUMMARY OF THE INVENTION

Accordingly, one object of this invention is to provide a cell for digital data storage which is compatible with integrated circuitry.

Another object is to provide a nonvolatile high speed data storage array employing thin-film storage diodes exhibiting a current-controlled negative resistance.

Another object is to provide a thin-film data storage array wherein size of the array is not limited by cross-talk.

Another object is to provide a method of batch fabricating, on a common substrate, a thin-film storage matrix capable of being destructively read out.

Briefly, in accordance with a preferred embodiment of the invention, a nonvolatile memory cell for digital data storage is provided. This cell comprises a pair of thin-film storage diodes connected in series opposition, and means for applying a voltage of predetermined polarity above a predetermined amplitude across the pair of series-connected diodes so as to switch the diodes into opposite conductivity states. Means are also provided for sensing voltage polarity at the junction common to both diodes in order to destructively sense the conductivity states thereof when the diodes are switched into opposite conductivity states. The memory cell may be connected in an array of rows and columns together with a plurality of other similar cells, and all of the cells may be batch fabricated on a common substrate.

BRIEF DESCRIPTION OF THE DRAWINGS

The features of the invention believed to be novel are set forth with particularity in the appended claims. The invention itself, however, both as to organization and method of operation, may best be understood by reference to the following description taken in conjunction with the accompanying drawings in which:

DESCRIPTION OF TYPICAL EMBODIMENTS

Figure 1:
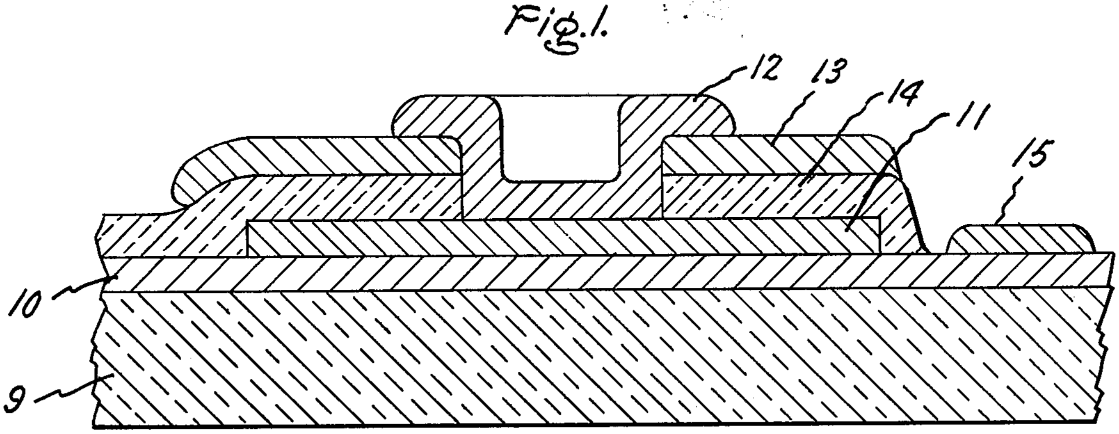
FIG. 1 is a sectional view of a thin-film diode employed in the storage cell of the instant invention.

FIG. 1 illustrates a thin-film diode similar to the type shown and described in J. R. Richardson application Ser. No. 631,775, filed Apr. 18, 1967 and assigned to the instant assignee. This diode comprises a thin-film 11 of semi-insulating gallium arsenide having its lower surface in intimate contact with the upper surface of a substrate 10 comprising a refractory metal such as molybdenum, tungsten or tantalum, formed atop an insulating base or substrate 9. An evaporated strip 13 of metal, such as platinum, aluminum or gold, is deposited over the diode after first coating the diode with a layer of insulation 14, such as silicon oxide. An opening is then etched through both metal 13 and insulation 14 above gallium arsenide film 11, and a counterelectrode 12 comprising a p-type semiconductor of appropriate bandgap and resistivity, preferably tellurium, is thereafter deposited on gallium arsenide film 11 through the etched opening so as to form a counterelectrode 12. Contact to substrate 10 may be made by evaporating a metallic electrode 15 thereon, such as aluminum.

The diode of FIG. 1 exhibits a bistable resistance state at zero bias, and thus manifests a storage capability. When in the OFF or high resistance state, the diode resistance is generally between $10^3$ and $10^6$ ohms, depending upon the resistivity of the gallium arsenide. Resistance of the diode, when in the ON state, ranges from 100 to 500 ohms.

Figure 2:
FIG. 2 is a schematic representation of the thinfilm diode of FIG. 1.

FIG. 2 is a schematic illustration of the diode of FIG. 1, wherein the arrow corresponds to the substrate of the diode, while the bar in front of the arrow corresponds to the tellurium counterelectrode of the diode. The symbol is used herein in the circuitry of schematic diagrams.

Figure 3A:
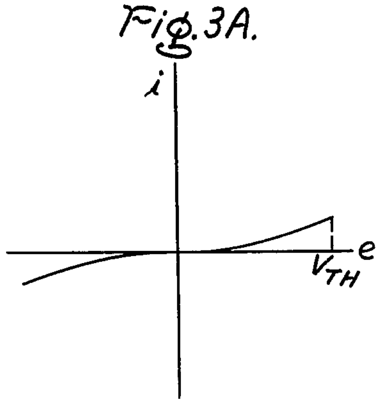
FIGS. 3A–3E are graphical representations of the switching characteristics of the thin-film diodes employed in the storage cell of the instant invention.
Figure 3B:
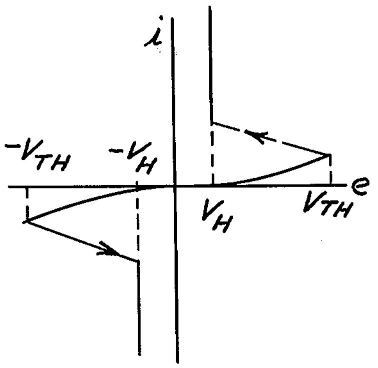

The switching characteristics of the thin-film gallium arsenide diodes utilized in the storage apparatus of the instant invention are illustrated in FIGS. 3A–3E, and employ the convention that applied voltage is positive when the counterelectrode is positive with respect to the substrate, and that forward or positive current flows through the diode from the counterelectrode toward the substrate. A diode initially in the OFF or high resistance state is depicted in FIG. 3A. This diode remains in the OFF state for all applied voltages below a threshold $V_{TH}$, which typically may be 5.0 volts. If this threshold voltage is exceeded, for either polarity, the diode switches to the ON or low resistance state, as shown in FIG. 3B. Typically, the voltage $V_H$ across the diode, when in the ON state, is approximately 0.7 volts.

Figure 3C:
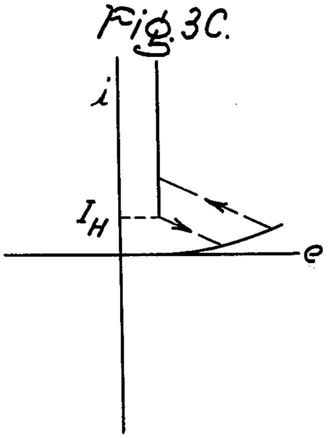
Figure 3D:
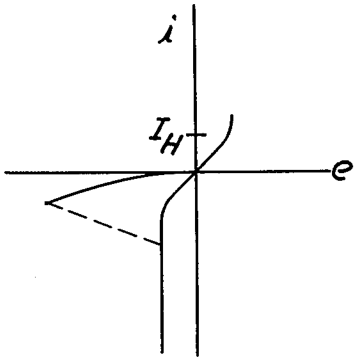
Figure 3E:
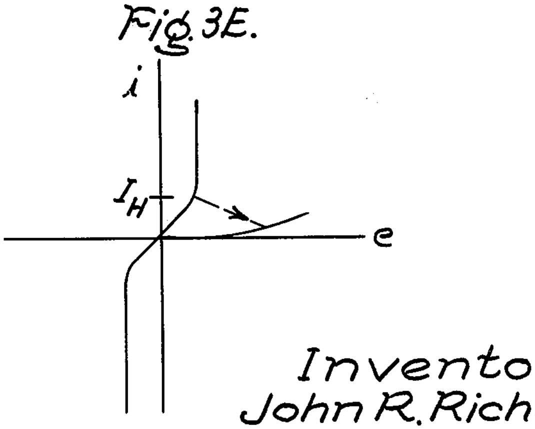

For switching with current of positive polarity, the diode remains in the ON state until the current is reduced below the holding value $I_H$. Thus, for currents below $I_H$, switching back to the OFF state takes place as shown in FIG. 3C, along the downward directed dotted line. FIG. 3D, however, shows a different behavior for current in the negative direction. In this case, the diode remains in the ON state for all values of negative current and for positive currents below $I_H$. To return the diode to the OFF condition, current $I_H$ must be exceeded in the positive direction, and the diode is then switched by decreasing the forward or positive current, as shown in FIG. 3E. Typical switching times are fractions of microseconds, but these times are circuitry limited and hence may be reduced by proper physical configuration of the circuitry. Because both states of the diode are stable with no applied potential, the diode is highly amenable to use as a memory device.

Figure 4:
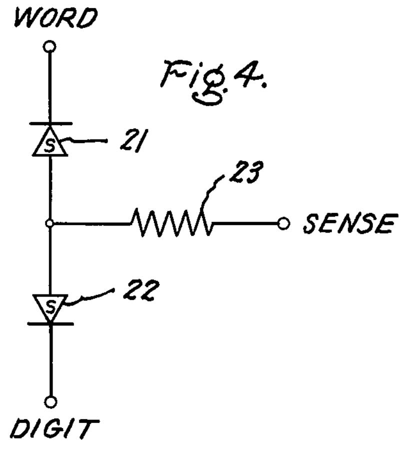
FIG. 4 is a schematic diagram of the circuitry of a typical storage cell of the instant invention.

FIG. 4 schematically illustrates the circuitry of a typical storage cell of the invention. A pair of thin-film storage diodes 21 and 22 are connected in series opposition, being formed on a common substrate. The opposite end of diode 21 comprises a WORD connection, while the opposite end of diode 22 comprises a DIGIT connection. A SENSE connection to the substrate is made through a resistance 23, in order to provide capability for sensing the conductivity state of the cell.

Figure 5:
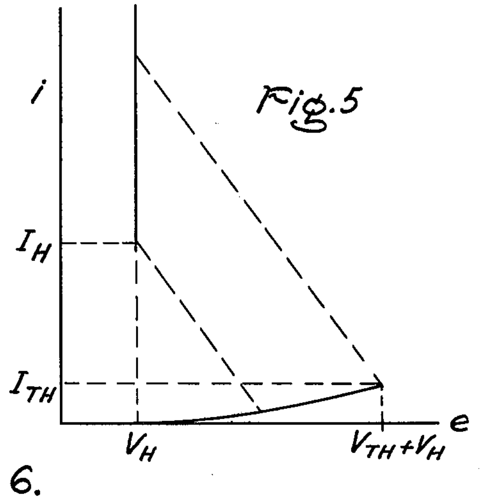
FIG. 5 is a graphical representation of electrical characteristics of the storage cell shown in FIG. 4.

Assuming an arbitrary convention selected for purposes of this application, the storage cell is deemed to be storing a ONE when diode 21 is in its high resistance state and diode 22 is in its low resistance state. When the conductivity states of the diodes are interchanged so that diode 21 is in its low resistance state and diode 22 is in its high resistance state, a ZERO is stored by diode 21. The current-voltage characteristic, as measured between the WORD connection and the DIGIT connection, is symmetric with respect to polarity, and is illustrated in FIG. 5. It should be noted that storage provided by the cell of FIG. 4 is nonvolatile, since the resistance states of the diodes thereof remain unchanged even if the current through the diodes is reduced to zero; that is, the cell retains stored data even if power thereto is interrupted for any reason. Typical values of the electrical parameters for the diodes employed in the storage cell of the invention, as designated on the curves of FIG. 5, are:

$V_{TH}$ = 4.3 volts
$V_H$ = 0.7 volts
$I_{TH}$ = 2.0 milliamps
$I_H$ = 10.0 milliamps Although the above values for the electrical parameters of the storage cell may be varied, depending upon the thickness of semi-insulating gallium arsenide film 11 in the diode illustrated in FIG. 1, the foregoing values are selected according to the thickness of the film so as to be conveniently compatible with typical parameters used in digital computer circuitry. In order to achieve the above values, the thickness of gallium arsenide film 11 is preferably 1,250 angstroms.

For a thin-film diode with the above parameters, the ON resistance near zero bias for a single diode is approximately 200 ohms, while the OFF state resistance is approximately $2 \times 10^5$ ohms. In order to store a ONE, a voltage pulse is applied between the WORD and DIGIT connections with polarity such that the WORD connection is driven positive with respect to the DIGIT connection. This voltage pulse must exceed 5.0 volts. Similarly, a 0 is written by applying a voltage pulse of the opposite polarity across the WORD and DIGIT connections of the storage cell of FIG. 4. Nondestructive sensing may then be accomplished by measuring resistance between the SENSE connection and the WORD connection in order to sense the resistance state of diode 21. For this purpose, the ohmic value of resistance 23 may be in the order of $10^5$ ohms, due to the large ratio of resistances in the ON and OFF states of diode 22. Alternatively, destructive sensing of the resistive state of diode 21 may be accomplished by applying a voltage pulse of a given polarity across the WORD and DIGIT connections of the storage cell and observing the voltage at the junction common to both diodes. For example, if the WORD connection is pulsed positively and the DIGIT connection simultaneously pulsed negatively by equal magnitudes of voltage, the voltage at the common junction is initially negative and moves in a positive direction as diode 21 switches into its ON state, provided a 1 was stored in the cell; if a 0 was stored, this voltage is initially positive and moves in a negative direction as diode 22 switches into its ON state. This latter form of sensing is destructive in that a change of state of the diodes in the cell is brought about in order to accomplish sensing.

Figure 6:
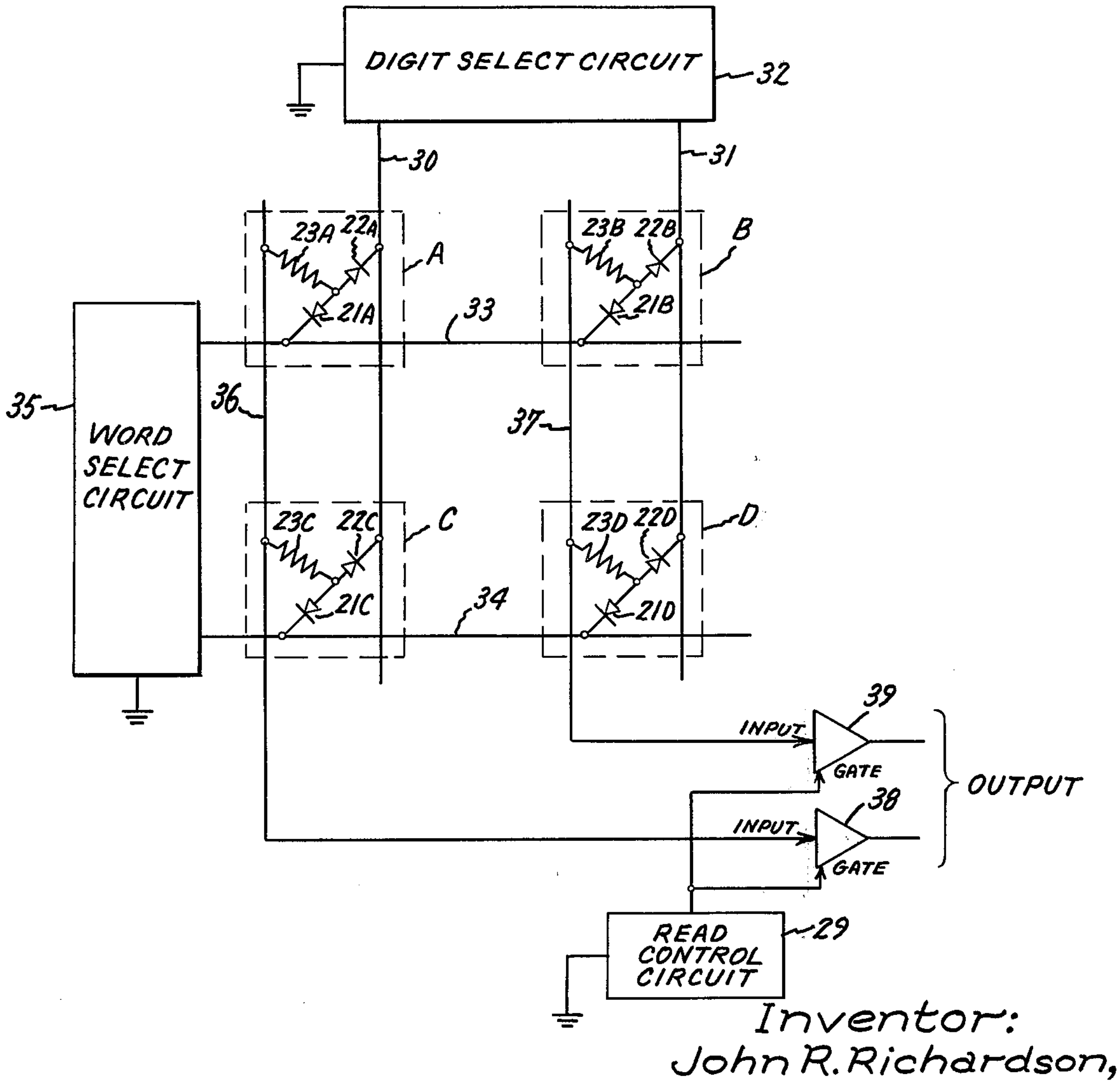
FIG. 6 is a schematic diagram of a simple memory array comprising a plurality of the storage cells shown in FIG. 4.

For illustrative purposes, a simple matrix employing the thin-film memory cell of FIG. 1 is shown schematically in FIG. 6; however, those skilled in the art will recognize that much larger matrices can be made up in this manner. Cells A, B, C and D are illustrated, each containing a pair of thin-film diodes 21 and 22 connected in series opposition, with a resistance 23 connected to a junction common to diodes 21 and 22. The diodes and resistances are identified according to their respective cells by the suffix A, B, C or D added to the identifying reference number. A pair of DIGIT lines 30 and 31 are provided, one for each column, and any DIGIT line may be individually energized with positive or negative voltage from a digit select circuit 32, while all remaining DIGIT lines are maintained at ground potential by circuit 32. Diodes 22A and 22C are connected to DIGIT line 30, while diodes 22B and 22D are connected to DIGIT line 31. Similarly, a pair of WORD lines 33 and 34 are provided, one for each row, and any WORD line may be individually energized with positive or negative voltage from a word select circuit 35, while all remaining WORD lines are maintained at ground potential by circuit 35. Diodes 21A and 21B are connected to WORD line 33, while diodes 21C and 21D are connected to WORD line 34. A pair of SENSE lines 36 and 37 are also provided, one for each column, and are connected to the input terminals of a pair of gated output amplifiers 38 and 39 respectively. A read control circuit 29 is connected to the gating terminals of amplifiers 38 and 39 to control grounding of the amplifier input terminals. Resistances 23A and 23C are connected to SENSE line 36, while resistances 23B and 23D are connected to SENSE line 37.

In operation, storage of data is achieved by pulsing the WORD line connected to each one of the cells in which data are to be stored with a voltage of predetermined amplitude and polarity, while simultaneously pulsing the DIGIT line connected to each one of the cells in which data are to be stored with a voltage of the same amplitude but opposite polarity. All other WORD and DIGIT lines in the matrix are maintained at ground potential by circuits 35 and 32 respectively, while all SENSE lines in the matrix are maintained at ground potential at the inputs to amplifiers 38 and 39 by read control circuit 29. The net result is to switch one diode in each of the cells thus energized into its low resistance or ON state, leaving the remaining diode in each of these cells in its high resistance or OFF state. By maintaining at least one diode in each cell in its OFF state, crosstalk through the diodes between different WORD or DIGIT lines is prevented.

By the arbitrary convention described supra, a ONE is stored in a cell when its diode 21 is OFF and its diode 22 is ON; conversely, when its diode 21 is ON and its diode 22 is OFF, a 0 is stored. The amplitude of voltage pulses used to switch the cells of the matrix is typically $0.75V_{TH}$ plus 0.7 volts, or about 3.9 volts. Since this value is below that of $V_{TH}$, the WORD and DIGIT lines must both be pulsed with voltage pulses of about 3.9 volts amplitude but opposite polarities in order to switch the selected cell of the matrix. To store a 1 in any particular cell, the DIGIT line connected to that cell is pulsed with −3.9 volts and the WORD line connected thereto is pulsed with +3.9 volts; conversely, to store a 0 in the cell, the DIGIT line is pulsed with +3.9 volts and the WORD line is pulsed with −3.9 volts. For example, to store a 1 in cell A and a 0 in cell D of the apparatus of FIG. 6, DIGIT line 30 is pulsed with negative voltage while DIGIT line 31 is maintained at ground potential; simultaneously, WORD line 33 is pulsed with positive voltage while WORD line 34 is maintained at ground potential. When DIGIT line 30 and WORD line 33 return to ground potential, diode 22A is in the ON state and diode 21A is in the OFF state. On the other hand, DIGIT line 31 may be pulsed with a positive voltage of 3.9 volts amplitude while DIGIT line 30 is maintained at ground potential and WORD line 33 is simultaneously pulsed with −3.9 volts while WORD line 34 is maintained at ground potential. This switches diode 21B into the ON state and maintains diode 22B in the OFF state so that, when DIGIT line 31 and WORD line 33 are returned to ground potential, cell B stores a 0 therein. In this fashion, data may be stored in the matrix.

To read stored data out of the matrix, the input terminals to amplifiers 38 and 39 are ungrounded by read control circuit 29, and destructive sensing of the type described, supra, is employed. For example, to sense cell A, digit select circuit 32 produces a negative pulse on DIGIT line 30, while word select circuit 35 produces a positive pulse on line 33. The positive and negative pulses produced by circuits 35 and 32 respectively are produced simultaneously, and are of equal magnitudes. Since a 1 has been stored in cell A, diode 22A is ON and diode 21A is OFF, so that the negative voltage on digit line 30 produces a negative voltage at the junction common to diodes 21A and 22A. However, since the magnitude of voltage applied across diodes 21A and 22A appears almost entirely across diode 21A, due to its high resistance condition, diode 21A switches into its ON state, causing the polarity of voltage at the junction common to diodes 21A and 22A to move in a positive direction. This positive-going potential acts through resistance 23A to produce a positive-going potential on SENSE line 36. This positive-going potential is amplified by amplifier 38 to result in an output signal representative of a 1 having been stored in cell A. Similarly, to sense the condition of cell B in which a 0 is assumed to have been stored, DIGIT line 31 is pulsed with a negative voltage of predetermined magnitude while WORD line 33 is simultaneously pulsed with a positive voltage of equal magnitude. In this cell, diode 21B has been in the ON condition and diode 22B in the OFF condition, as described, supra. Accordingly, the positive voltage applied from WORD line 33 initially results in a positive voltage at the junction common to diodes 21B and 22B. However, since the magnitude of voltage between lines 31 and 33 appears almost entirely across diode 22B, due to its high resistance condition, diode 22B is switched into the ON condition, and the potential of the junction common to diodes 21B and 22B is driven in a negative direction. This negative-going voltage is then supplied through resistance 23B to SENSE line 37 and thence through amplifier 39, resulting in an output signal representative of a 0 having been stored in cell B. Thus, a positive-going voltage indicates that a 1 has been read out, while a negative-going voltage indicate that a 0 has been read out. This form of readout is destructive, since a change in state of the diodes in each sensed cell must be brought about in order to accomplish sensing.

Figure 7:
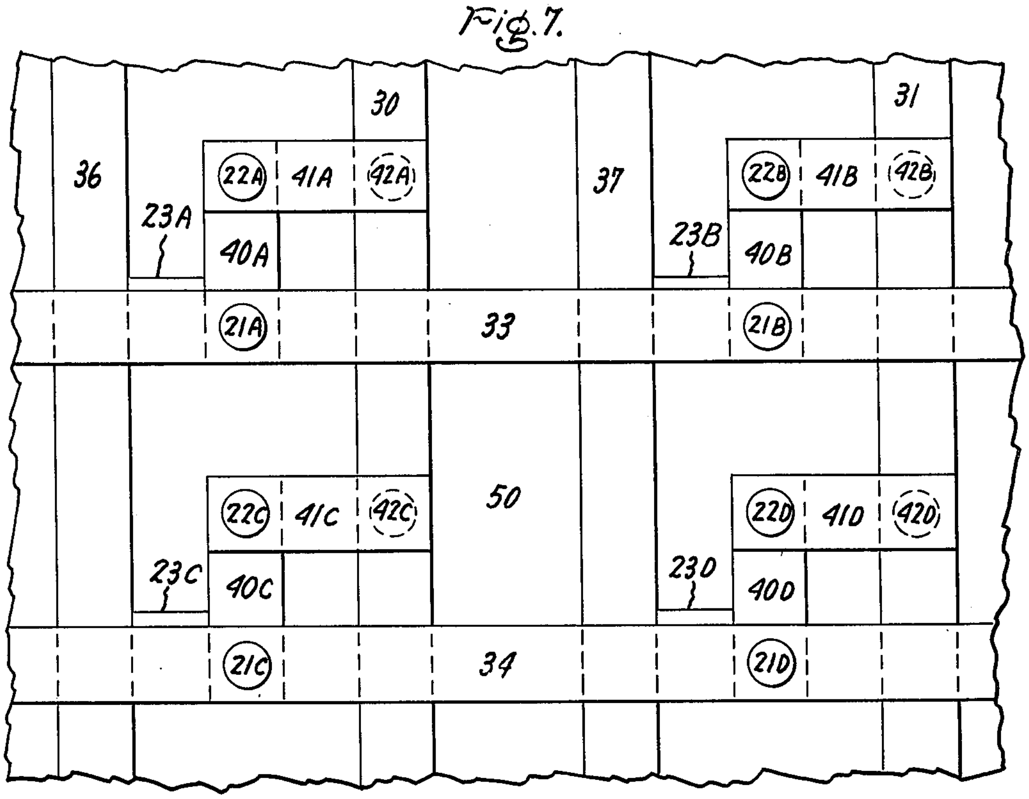
FIG. 7 illustrates the arrangement of conducting elements on a batch fabricated memory matrix constructed according to the teachings of the instant invention.

FIG. 7 is a view of the interconnections of a portion of a diode matrix, such as the 4-cell portion shown schematically in FIG. 6. In FIG. 7, columnar conductors formed atop an insulating substrate 50 are shown typically as platinum DIGIT leads 30 and 31, platinum SENSE leads 36 and 37, and gallium arsenide coated metallic interconnection leads 40A, 40B, 40C, and 40D, while row conductors are shown typically as platinum WORD leads 33 and 34 and platinum interconnection leads 41A, 41B, 41C and 41D. Leads 41A and 41C are connected to DIGIT lead 30 at junctions 42A and 42C, while leads 41B and 41D are connected to DIGIT lead 31 at junctions 42B and 42D. Diodes 21A and 22A, of the general type illustrated in FIG. 1, are connected to each other through platinum strip 40A, with diode 21A connected to strip 33 and diode 22A connected to strip 41A. Similar connections are made for diodes 21B and 22B, 21C and 22C, and 21D and 22D. Resistance 23A comprises a layer of tantalum, or nickel chromium alloy such as Nichrome, which is a trademark of Driver-Harris Company, Harrison, N.J., for particular compositions comprising alloys of nickel and chromium, extending between and beneath platinum strips 36 and 40A in order to provide a connection to SENSE strip 36 from diodes 21A and 22A. Resistances 23B, 23C and 23D are formed in similar fashion in the other cells of the matrix in order to provide similar connections therein.

Figure 8A:
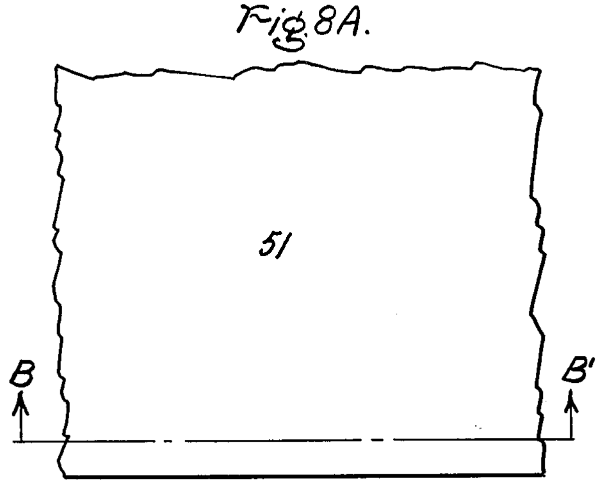
FIGS. 8A–8N and 8P–8S illustrate various steps performed in fabricating the apparatus shown in FIG. 7.

In order to utilize batch fabrication techniques to full advantage, the matrix illustrated in FIGS. 6 and 7 is fabricated by depositing a plurality of different layers, and then separately patterning selected layers by standard photolithographic methods in order to ensure clean interfaces between various layers. The description which follows is one example of the techniques employed in forming apparatus in accord with the present invention. Thus, fabrication of the matrix illustrated in FIGS. 6 and 7 is begun by depositing material to comprise resistances 23 on a substrate comprising any insulator which is sufficiently stable and smooth, such as glass. Other suitable substrate materials include oxidized or nitrided silicon, alumina, sapphire, etc. The material to comprise resistances 23 may be sputtered tantalum, or a nickel-chromium alloy preferably comprising 80% nickel and 20% chromium. Typically, a layer of Nichrome of 50 angstroms thickness is deposited onto the substrate by either sputtering or electron beam evaporation, at a substrate temperature of 350°C. The result of this deposition is illustrated in plan view in FIG. 8A and in section along line BB' of FIG. 8A in FIG. 8B wherein Nichrome layer 51 is shown deposited on glass substrate 50.

The ohmic value to be used for resistances 23 is determined by the resistances of the memory diodes in their ON and OFF states and the value of the threshold voltages $V_{TH}$ and holding currents $I_H$. One limitation on the minimum ohmic value to be used for each of resistances 23 is that each of resistances 23 must be large enough to limit current from a WORD or DIGIT line in series with a diode and a grounded SENSE line to a value less than the holding current $I_H$. Thus, the ohmic value R of each of resistances 23 must exceed the ratio $(V/I_H)$ where V is the voltage applied to any particular line of the matrix. For example, if V is 3.00 volts, and $I_H$ is $2.0 \times 10^{-3}$ amps, the ohmic value of each of resistances 23 must exceed $1.5 \times 10^3$ ohms. For a holding current of $10 \times 10^{-3}$ amps, however, the minimum ohmic value for each of resistances 23 would be reduced to a more conveniently fabricated value of 300 ohms.

A second limitation on the minimum ohmic value to be used for each of resistances 23 is that during reading of any cell, the neighboring cells of the matrix must be prevented from having their diodes which are in the OFF state switched ON by the combined voltage of the pulse applied to a matrix line which is connected to the cell being read and neighboring cells and the pulse appearing at the junction of the two diodes in any one of these neighboring cells. These pulses may combine through a SENSE line and resistances 23 in the cell being read and in the neighboring cell. This undesirable circuit path may be seen in FIG. 6, and from this path the following condition necessary to avoid spurious switching may be derived:

$$V + V \frac{R_{ON}}{2R + R_{ON}} < V_{TH}$$

where $R_{ON}$ is the resistance of a diode when in its ON condition. If $R_{ON}$ is 200 ohms, V is 3.00 volts and $V_{TH}$ is 4.3 volts, then this expression requires that R be greater than 150 ohms to avoid spurious switching.

If Nichrome is deposited in a film of 50 angstroms thickness, the film has a sheet resistance of about 250 ohms per square, sheet resistance being defined as the resistivity of the Nichrome divided by the thickness of the Nichrome film. Hence, by employing a length to width ratio of 2, the film resistance, measured along its length, is 500 ohms. The temperature coefficient of the resulting resistance is about 0.05 percent per degree centigrade.

Figure 8C:
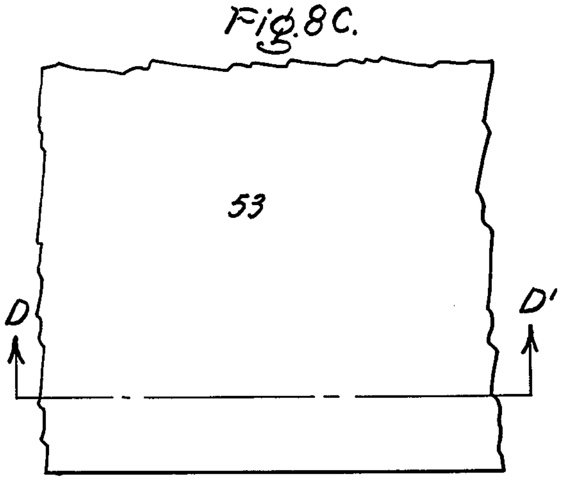
Figure 8B:
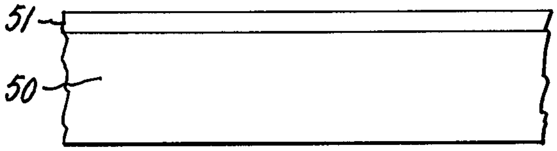
Figure 8D:
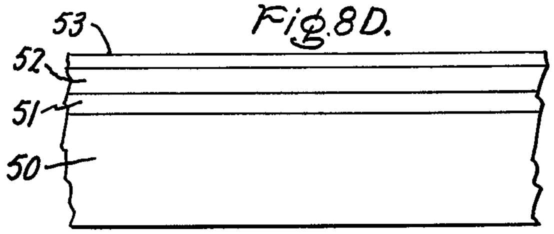

After Nichrome layer 51 has been deposited, and with substrate 50 maintained at the 350°C temperature, refractory metal 52 for the SENSE and DIGIT lines and an interconnection pad such as those designated by the reference numbers 40 in FIG. 7 is next deposited atop Nichrome layer 51, as seen in the sectional view shown in FIG. 8D, to a thickness of about 4,000 angstroms. Typically, the refractory metal, which is evaporated or sputtered onto Nichrome layer 51, comprises molybdenum, tungsten or tantalum. For descriptive purposes, it will be assumed that layer 52 comprises molybdenum.

A layer of gallium arsenide 53 is thereafter deposited over molybdenum layer 52, resulting in the structure shown in plan view in FIG. 8C and in section along line DD' of FIG. 8C in FIG. 8D. The substrate temperature, thickness of gallium arsenide layer 53, and rate of deposition of gallium arsenide determine the characteristics of each diode in each memory cell. The gallium arsenide may be deposited by coevaporation of the gallium and arsenic elements, or by flash evaporation or sputtering of the gallium arsenide compound. For example, depositing the gallium arsenide by controlled coevaporation of the gallium and arsenic elements at a rate of 0.4 micrograms per square centimeter per second to produce a film 1,000 angstroms in thickness at a substrate temperature of 150°C results in diodes having the following properties:

$V_{TH} = 4.3$ volts
$I_H = 10.0$ milliamps
$I_{ON} = 200$ ohms
$(R_{OFF}/R_{ON}) = 10^3$.

A detailed description of coevaporation of gallium and arsenic to produce a film of gallium arsenide is presented in aforementioned J. R. Richardson application Ser. No. 631,775, filed Apr. 18, 1967, and assigned to the instant assignee.

Figure 8E:
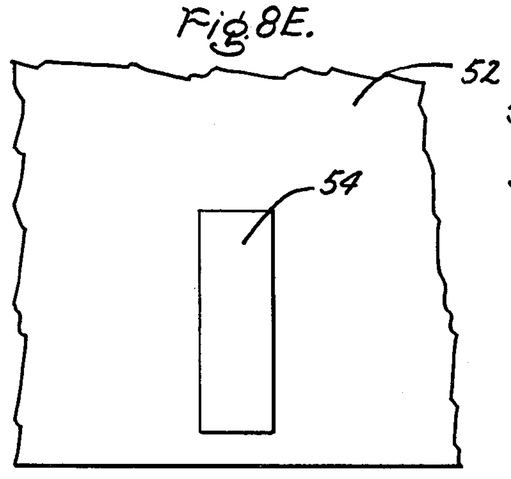

Patterning of gallium arsenide layer 53 is performed by conventional photolithographic or photoresist techniques so as to completely etch away the gallium arsenide layer, except for a region 54 as illustrated in FIG. 8E. The gallium arsenide is etched by a methanol bromine etch comprising 3 ml. bromine per gallon of methanol, leaving molybdenum layer 52 exposed to view except for the portion coated by gallium arsenide region 54. Next, the device is again conventionally patterned and the molybdenum layer is etched to leave both DIGIT and SENSE lines 55 and 56 respectively, together with molybdenum region 57 situated beneath gallium arsenide region 54, as shown in plan view in FIG. 8F and in section as viewed along line GG' of FIG. 8F in FIG. 8G. Where the molybdenum has been etched away, Nichrome layer 51 is exposed to view. A typical etchant suitable for use on molybdenum comprises one volume concentrated nitric acid, 1 volume concentrated sulfuric acid, and three volumes water.

Figure 8H:
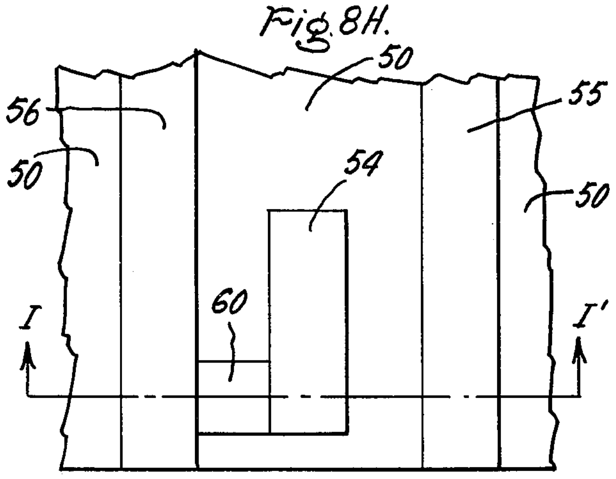
Figure 8F:
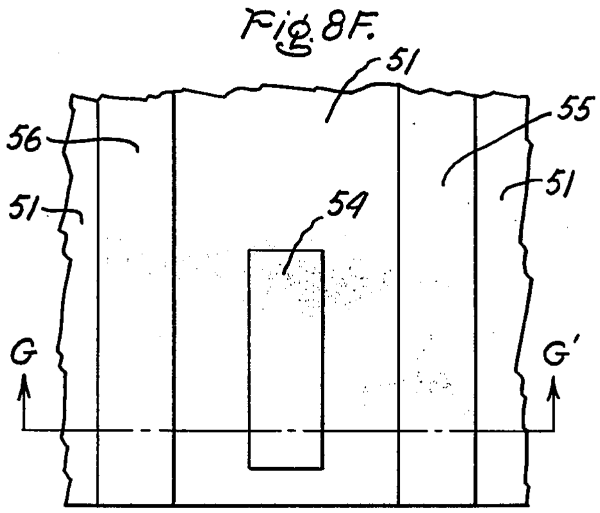
Figure 8I:
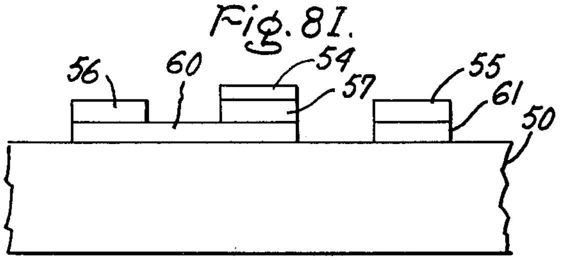
Figure 8G:
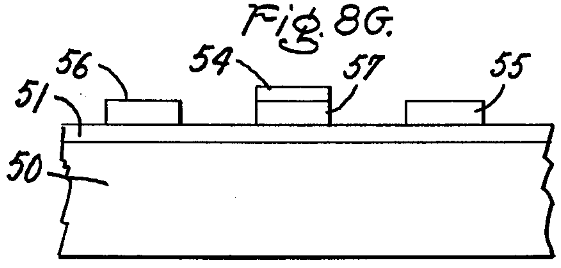

The resistances of each cell are next formed by patterning Nichrome layer 51 according to predetermined areal proportions so as to achieve the desired ohmic value. This is accomplished by masking the entire upper surface of the device by conventional photolithographic techniques, except for the regions of Nichrome desired to be etched. After etching the Nichrome layer with a solution of ferric chloride, only a region 60 of Nichrome remains exposed to view, as illustrated in FIG. 8H. The device of FIG. 8H, as viewed along line II', results in the sectional view illustrated in FIG. 8I, wherein region 60 is seen to extend beneath, and make contact with, interconnection pad 57 and SENSE line 56. In addition, a second region of unetched Nichrome 61 remains beneath DIGIT line 55. At this juncture, the overall width of Nichrome resistance region 60, as viewed in FIG. 8I, is preferably about 15 mils, so as to produce a resistance along its length of about 500 ohms ± 25%. A 2,000 angstrom thickness of silicon dioxide is next deposited over the entire substrate at a substrate temperature which does not change the properties of gallium arsenide region 54 adversely. A 350°C substrate temperature is suitable for this purpose. The silicon dioxide deposition may be performed by radio frequency sputtering of quartz, radio frequency decomposition of an organic silicate in an oxygen atmosphere (such as described by H. F. Sterling et al., The Deposition of Adherent Coating of Insulants in a Radio Frequency Flow Discharge, Le Vide, Special A.V.I.SEM, Oct. 1966, page 80), dc sputtering of silicon in an atmosphere of nitrous oxide, or by evaporation of silicon monoxide in an oxygen atmosphere.

Figure 8J:
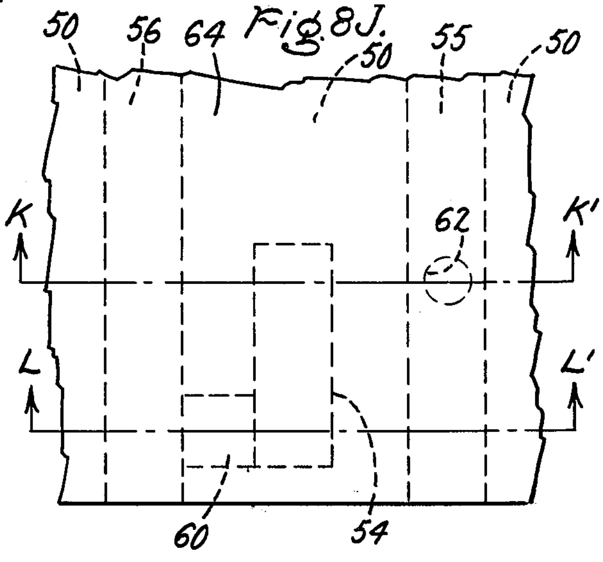
Figures 8K, 8L, 8M, 8N, 8P, 8Q, 8R, 8S:
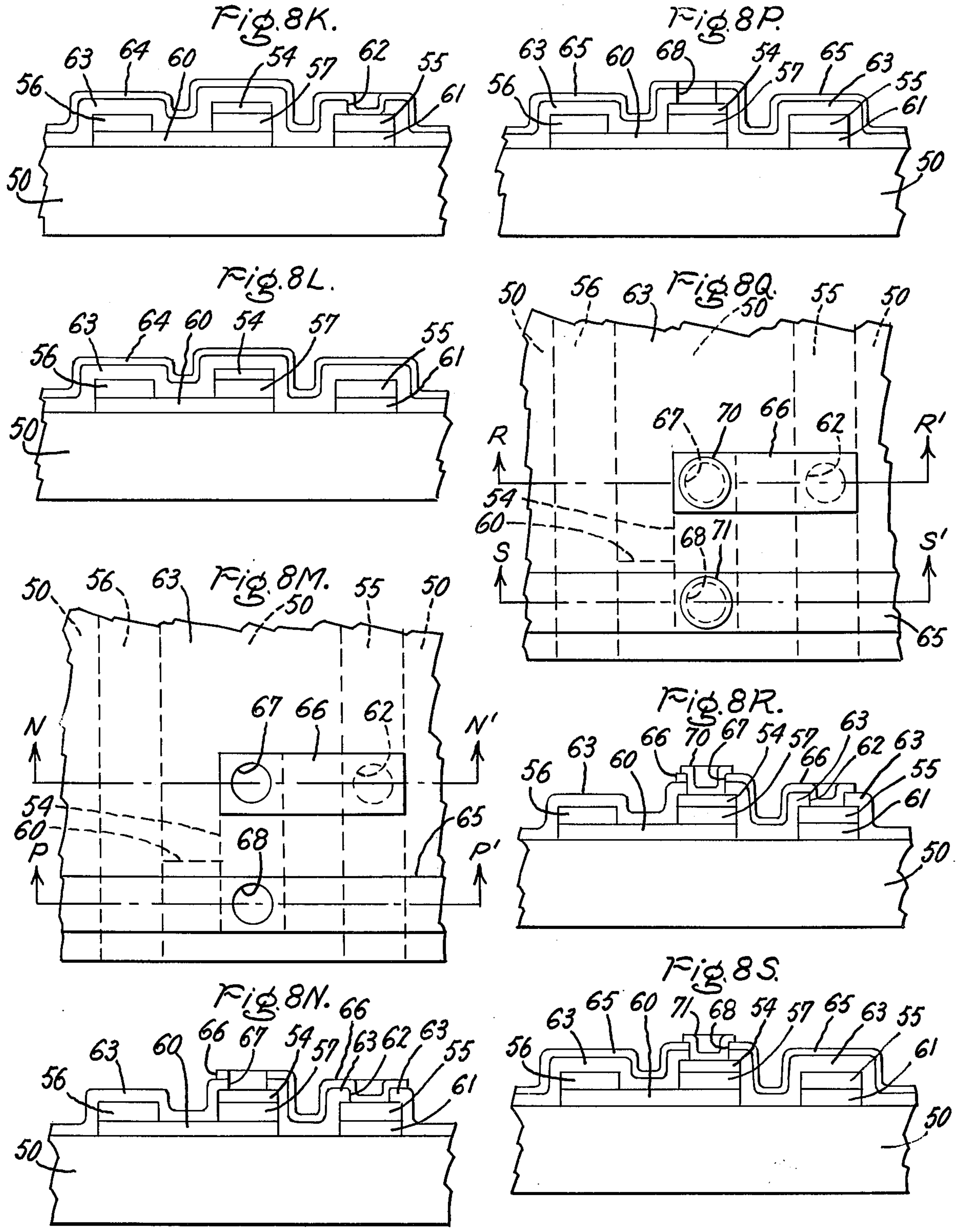

An opening 62 is then etched through the silicon dioxide layer down to DIGIT, line 55, as shown in FIG. 8J, by employment of a buffered hydrofluoric acid etch, for example. Platinum, or other suitable metal such as gold or aluminum, is then sputtered or evaporated as a continuous layer, 4,000 angstroms thick, over the silicon dioxide layer and down through opening 62 to digit line 55. This deposition is performed at a substrate temperature of 300°C, resulting in a structure which is shown in section in FIGS. 8K and 8L, each of which represents a section of the structure shown in FIG. 8J as viewed along lines KK' and LL' respectively. In FIG. 8K, silicon dioxide layer 63 is shown with opening 62 atop digit line 55, and with an overlayer 64 of platinum which makes contact with digit line 55 through opening 62 in silicon dioxide layer 63. Similarly, silicon dioxide layer and platinum layer 64 are illustrated in their respective positions in FIG. 8L.

Platinum layer 64, shown in FIGS. 8K and 8L, is next etched away by use of conventional photolithographic masking techniques so as to leave platinum WORD line 65 and platinum interconnection strip 66, as illustrated in FIG. 8M, along with two openings 67 and 68 etched through platinum strips 66 and 65 respectively down to layer 63 of silicon dioxide coated over gallium arsenide layer 54. Aqua regia is suitably employed as the etchant for platinum. The surface of the device shown in FIG. 8M is thereupon again masked by conventional photoresist techniques, and a buffered hydrofluoric acid etch is then applied through openings 67 and 68 in platinum regions 66 and 65 respectively so as to deepen openings 67 and 68 by etching down through the silicon dioxide to gallium arsenide layer 54. FIGS. 8N and 8P illustrate sectional views of the device shown in FIG. 8M as viewed along lines NN' and PP', respectively.

As the next step, the device illustrated in FIG. 8M is maintained at a substrate temperature of 100°C while tellurium is evaporated over the entire substrate and down through openings 67 and 68 to make contact with gallium arsenide region 54. The tellurium, which is deposited to a thickness of 2,000 angstroms, is evaporated onto the device from a graphite crucible. By employment of conventional photolithographic masking techniques, the tellurium is then etched away with nitric acid so as to leave only a pair of regions 70 and 71 coated over the platinum surrounding openings 67 and 68 respectively. FIGS. 8R and 8S illustrate, in section, the structure of FIG. 8Q as viewed along lines RR' and SS', respectively. Thus, the structure illustrated in FIGS. 8Q, 8R and 8S represents a single memory cell of a memory matrix employing a plurality of such cells. If desired, the entire memory array may now be sealed in an appropriate insulator seal, such as epoxy. It should now be apparent that the size of a matrix comprising a plurality of memory cells of the type herein described may be fabricated in a configuration of size compatible with that of integrated circuits.

The foregoing describes a cell for digital data storage which is compatible with integrated circuitry, and the forming thereof. Each cell employs thin-film storage diodes exhibiting current-controlled negative resistance. A nonvolatile high speed data storage array of a size which is not limited by crosstalk may be made up of a plurality of such cells. A method of batch fabricating on a common substrate a thin-film storage matrix capable of being destructively read out is also described.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. A nonvolatile memory cell for digital data storage comprising:

a pair of thin-film storage diodes connected in series opposition;

means for applying a voltage of predetermined polarity above a predetermined amplitude across the pair of series-connected diodes so as to switch said diodes into opposite conductivity states; and means coupled to the junction of both of said diodes in order to provide an indication of the conductivity states of said diodes by sensing polarity of a voltage change at said junction when said diodes are switched into opposite conductivity states.

2. The nonvolatile memory cell of claim 1 wherein each of said diodes comprises a layer of gallium arsenide between a layer of tellurium and a layer of refractory metal, said refractory metal comprising one of the group consisting of molybdenum, tungsten and tantalum.

3. The nonvolatile memory cell of claim 2 wherein said means coupled to the junction of both of said diodes comprises an alloy of nickel and chromium.

4. An array for storage of digital data comprising:

a plurality of memory cells, each cell including a pair of thin-film storage diodes connected in series opposition;

conductive means connecting said memory cells in an array of rows and columns;

means for selectively applying a voltage of predetermined polarity above a predetermined amplitude across ony one of said pairs of seriesconnected diodes through said conductive means so as to switch the diodes of said one of said pairs into opposite conductivity states; and means coupled to the junction of both diodes of any one of said pairs in order to provide an indication of the conductivity states of the diodes in said one of said pairs by selectively sensing polarity of a voltage change at said junction when the diodes of said one of said pairs are switched into opposite conductivity states.

5. The array of claim 4 wherein each of said diodes comprises a layer of refractory metal overlaying a common substrate, said refractory metal comprising one of the group consisting of molybdenum, tungsten and tantalum, a layer of gallium arsenide overlaying and in intimate contact with said refractory metal, and a layer of tellurium overlaying and in intimate contact with said layer of gallium arsenide.

6. The array of claim 4 wherein each pair of diodes in each cell comprise a common layer of refractory metal overlaying a common substrate, said refractory metal comprising one of the group consisting of molybdenum, tungsten and tantalum, a common layer of gallium arsenide overlaying and in intimate contact with said refractory metal, and first and second layers of tellurium overlaying and in intimate contact with said layer of gallium arsenide, said first and second layers of tellurium being spaced apart from each other on said layer of gallium arsenide.

7. The array of claim 6 wherein said means coupled to the junction of both diodes of said one of said pairs comprises a layer of an alloy of predetermined sheet resistance, said alloy overlaying said common substrate and being in intimate contact with said refractory metal.

8. The array of claim 7 wherein said alloy comprises nickel and chromium, said layer of alloy extending on said substrate beneath a portion of said layer of refractory metal.

9. The array of claim 7 wherein said conductive means comprises first columns of metallic strips, each of said strips of said first columns being electrically connected to said first layers of tellurium of the cells in each respective column, second columns of metallic strips spaced apart from said first columns of metallic strips, each of said strips of said second columns being electrically connected to said layer of an alloy of predetermined sheet resistance of the cells in each respective column, and a plurality of rows of metallic strips spaced apart from said first and second columns of metallic strips, each of said strips of said rows being electrically connected to said second layers of tellurium of the cells in each respective row.

10. The array of claim 9 wherein said metallic strips comprise electrically separated layers of platinum deposited on said array.

11. The array of claim 9 including circuit means for energizing said first columns of metallic strips and said plurality of rows of metallic strips, and readout means coupled to said second columns of metallic strips for providing output signals from said array.

12. The array of claim 11 including means for selectively grounding said second columns of metallic strips.

* * * * *